Sept. 12, 1961  H. M. ALEXANDER ET AL  2,999,341
CLEANING GLASS SUPPORTING TABLES
Filed Oct. 22, 1956

INVENTORS
Harold M. Alexander and
BY William E. McCown

Nobbe & Swope
ATTORNEYS

United States Patent Office 2,999,341
Patented Sept. 12, 1961

---

2,999,341
CLEANING GLASS SUPPORTING TABLES
Harold M. Alexander and William E. McCown, Toledo, Ohio, assignors to Libbey-Owens-Ford Glass Company, Toledo, Ohio, a corporation of Ohio
Filed Oct. 22, 1956, Ser. No. 617,634
3 Claims. (Cl. 51—277)

The present invention relates broadly to the surfacing of glass sheets or plates, and more particularly to the cleaning of the glass tables employed in the surfacing operation.

While not restricted to any particular use, the apparatus of this invention has proved of special utility when used in the method of grinding and polishing plate glass blanks, which is referred to as the continuous method. According to this method a plurality of glass blanks are mounted on a series of movable cars or tables arranged in end to end relation and moved continuously in a predetermined path. The travel of the tables along such path brings the blanks first into engagement with a series of grinding units and then into engagement with a series of polishing units.

Glass blanks, which are to be surfaced as described above, are placed on the tables in slightly spaced relation, and according to conventional practice, are secured to the tops of these tables by being secured in a layer of plaster of Paris, or the like, which has previously been applied to the tops of the tables. The glass blanks are then pressed onto the layer of plaster while it is still wet and through the application of a rolling pressure on the upper surfaces of the blanks, or by tamping the blanks. This bedding of the glass blanks in the plaster serves to present to the grinding apparatus a surface of glass which is level and evenly supported and thereby minimize breakage of the glass during the surfacing operation.

Prior to the application of plaster to the table top or deck, the table is ordinarily washed and brushed with a rotary steel wire brush to remove any plaster or other foreign bodies which may be on the table from a previous surfacing operation. However, the cleaning of the tables with a wire brush has not proven entirely satisfactory since it leaves small pieces of the brush on the table top or deck after the brushing operation. It has been found that some breakage of glass blanks during the surfacing operation can be attributed to these small pieces of steel wire being embedded in the plaster.

Therefore, it is a primary object of the present invention to eliminate breakage of the glass sheets due to the presence of small pieces of wire or other foreign bodies embedded in the plaster or other material used for securing the glass sheets to the work tables.

Another object of the invention is the provision of means for magnetically removing foreign bodies from the table tops.

A further object is provision of means for effecting the reduction of residual magnetism in a table on which glass sheets or blanks are carried during a surfacing operation, in order that foreign bodies may be more effectively magnetically removed from the surface of the tables.

Other objects and advantages of the invention will become more apparent during the course of the following description when taken in connection with the accompanying drawings.

In the drawings, wherein like numerals are employed to designate like parts through the same:

Figure 1:
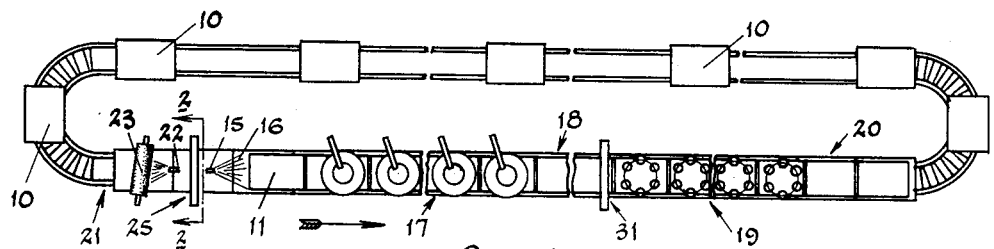
FIG. 1 is a diagrammatic plan view of a continuous grinding and polishing line.

Referring now more particularly to the drawings, there is shown in FIG. 1 a continuous grinding and polishing system. The system includes a plurality of tables 10 provided with flat horizontal top surfaces and secured together, in end to end relation, for movement along the tracks 12 path and upon which glass blanks 11 are placed during a surfacing operation. These tables are equipped with rotatably attached rollers 13 which ride on rails 12 and thus allow the tables to be moved. The tracks or rails 12 are firmly secured to a base supporting structure 14.

Glass blanks 11, to be surfaced, are secured in a layer of plaster which may be sprayed onto tables 10 by nozzle 15 in the laying yard 16, and carried by these tables to the surfacing area where they are conveyed successively under a series of grinding units 17, into a middle yard 18 where any blanks which may have been broken during the grinding operation are removed, and then under a series of polishing units 19. The sheets are then carried to a stripping yard 20 where they are removed from the tables and returned to the laying yard 16 to be relaid with the ground and polished side down in order that the unsurfaced side may be finished. The laying of the glass on the tables and the removal therefrom is usually performed by means of suitable frames supplied with suction platens, these frames being attached to a traveling crane (not shown).

After a glass blank has been removed from a table 10, the table is returned to a cleaning section 21 where the dried plaster from the surfacing operation is removed. The cleaning is accomplished by a combination of wetting action of a spray 22 and a brushing action provided by the rotary motion of a steel wire brush 23.

As a result of this brushing of the table tops by the brush 23 a number of small wire bristles 24 (FIG. 3) very often remain on the top of these tables. Therefore, in the preferred form of the invention a magnetic unit 25 is positioned slightly above and transverse to a table top in the laying yard 16. This magnetic unit, the construction of which will be discussed later, magnetically removes these wire bristles 24 from the surface of the cleaned tables and thus prevents their being mixed with and becoming embedded in the plaster in the bedding operation.

The magnet unit 25 is supported by vertical members 26. The magnetic unit 25 consists of a plurality of horseshoe-shaped permanent magnets 27 disposed in a slightly spaced relation along a horizontal line which extends across the complete width of table 10. These individual magnets 27 cooperate to form a single magnet operating over the complete width of a table 10. These horseshoe magnets are so arranged that the north poles are all on the same side and thus the south poles are along the opposite side. This arranging of like poles of the magnets 27 on the same side of the magnetic unit 25 produces a concentrated magnetic field and thus provides a more efficient cleaning operation. As is disclosed in FIG. 3, the magnetic force of the unit 25 attracts the steel bristles 24 and thus removes them from the tops of tables 10, and causes them to adhere to plate 28 from which they may be conveniently cleaned off.

Figure 2:
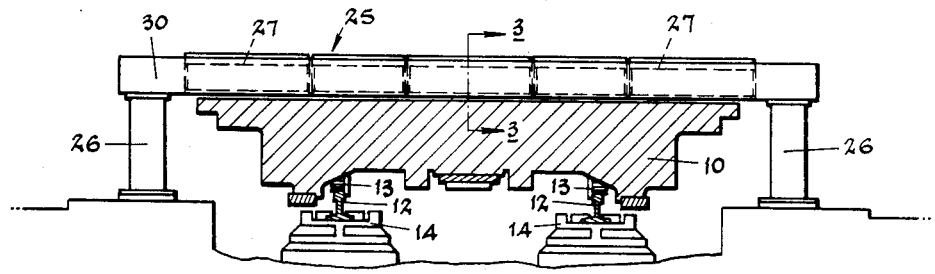
FIG. 2 is a cross-sectional view through 2—2 of FIG. 1 of a table and a magnetic unit in operative position according to the invention.
Figure 3:
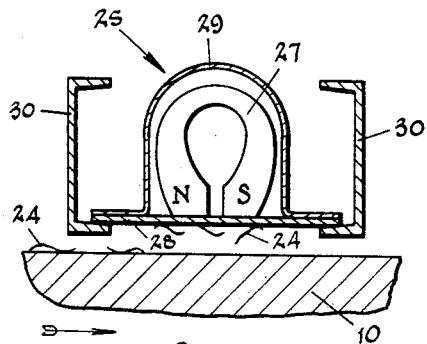
FIG. 3 is a cross-sectional view of a magnetic unit taken along line 3—3 of FIG. 2.

In FIG. 3 there is shown a cross-sectional view of a magnetic unit 25 giving its construction in detail. The magnet unit 25 consists of a row of magnets 27 set on a rectangular plate 28 and covered by a metallic enclosure 29. The plate 28 rests on the flanges of two channel irons 30, which are secured to vertical supports 26 (FIG. 2).

Figure 4:
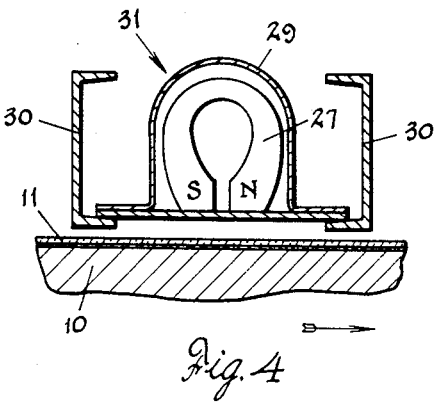
FIG. 4 is a cross-sectional view of a magnetic unit, similar to that of FIG. 3, which is used for the demagnetizing of a table top.

Since the conventional material of which tables 10 are constructed is cast iron, a ferromagnetic material, these tables become magnetized on making repeated trips underneath the magnet unit 23. Having become thus magnetized, the tables 10 present an attracting force to the bristles 24 which is opposite to the force exerted by the unit 25, and thus reduces the efficiency of the operation of the magnetic unit. Because of this action it is advisable to de-magnetize the tables. The de-magnetizing, or de-gaussing, of the tables is provided by placing a magnetic unit 31, similar in construction to unit 25, slightly above and transverse to the path of travel of the tables, preferably in the middle yard 18. This magnetic unit 31, the construction of which is shown in FIG. 4, differs from unit 25 in that the polarities of the individual units have been reversed, i.e., if the polarities where north and south on the unit 25 going from left to right, then the polarities of the de-magnetizing unit 31 would be south and north going from left to right (compare FIGS. 3 and 4). This reversal of polarities is necessary in order to bring the residual magnetism of the table 10 to an approximately zero status. A cross-sectional view of a de-magnetizing unit 31 is shown in FIG. 4 in its operative position above a table 10 on which a glass blank 11 is bedded.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. A method of cleaning metal tables, which tables support individual glass sheets for movement along a substantially horizontal path and under a series of surfacing tools, the glass sheets being embedded in bedding material carried by said tables and said tools engaging the surfaces of the said glass sheets to surface the same including the steps of cleaning the top magnetizable metallic surface of each table by brushing the same with a metallic brush prior to covering said top table surface with bedding material, passing the tables after brushing and before bedding material is placed thereon through a first magnetic field to remove from the top metallic table surface any foreign metallic matter resulting from the brushing treatment and to magnetize said table and passing the tables beneath a second magnetic field of reversed polarity, after the table has carried the glass sheets under the surfacing tools, to demagnetize the metal tables before the glass sheets and bedding material are removed from said tables.

2. A method of cleaning metal surfaced tables in a glass surfacing operation comprising brushing the magnetizable metal surfaces of said tables with a metal brush, thereafter passing the brushed tables through a first magnetic field to remove from the metal surfaces of the tables foreign matter resulting from said brushing, and subsequently passing said tables through a second magnetic field of reversed polarity from said first field to demagnetize the metal surfaces of said tables.

3. In apparatus for cleaning metal surfaced tables in a glass surfacing operation the combination, with means for moving said tables along a predetermined path, of a wire brush positioned above said path to contact the magnetizable metal surfaces of the tables as they move therepast, means for driving said brush, a first magnetic unit mounted transversely over and slightly above the path of travel of said tables for setting up a magnetic field across the metal surface thereof to remove foreign matter resulting from contact of said surface by said wire brush, and a second magnetic unit of reversed polarity with respect to said first magnetic unit mounted transversely over and above the path of travel of said tables for creating a demagnetizing field over the metal surface of the tables as they move therepast.

References Cited in the file of this patent

UNITED STATES PATENTS

| Re. 21,927 | Brace et al. | Oct. 21, 1941 |
| Re. 22,191 | Wade | Sept. 29, 1942 |
| 749,179 | Forwood | Jan. 12, 1904 |
| 1,745,970 | Andrew | Feb. 4, 1930 |
| 2,455,319 | Stearns | Nov. 30, 1948 |
| 2,660,318 | Watson | Nov. 24, 1953 |
| 2,693,279 | Box et al. | Nov. 2, 1954 |
| 2,824,321 | Bandy | Feb. 25, 1958 |

OTHER REFERENCES

Sohnemann: "Electronic Device Protects Conveyor Belts and Crushers," page 66, Canadian Mining Journal, December 1951. (Copy in 209—215, Div. 67.)